July 17, 1962 C. L. FRY 3,044,603
CONVEYOR-BELT TURN

Filed Aug. 25, 1958 2 Sheets-Sheet 1

INVENTOR.
Charles L. Fry
BY WHITEHEAD, VOGL, & LOWE
PER Frank C. Lowe
ATTORNEYS

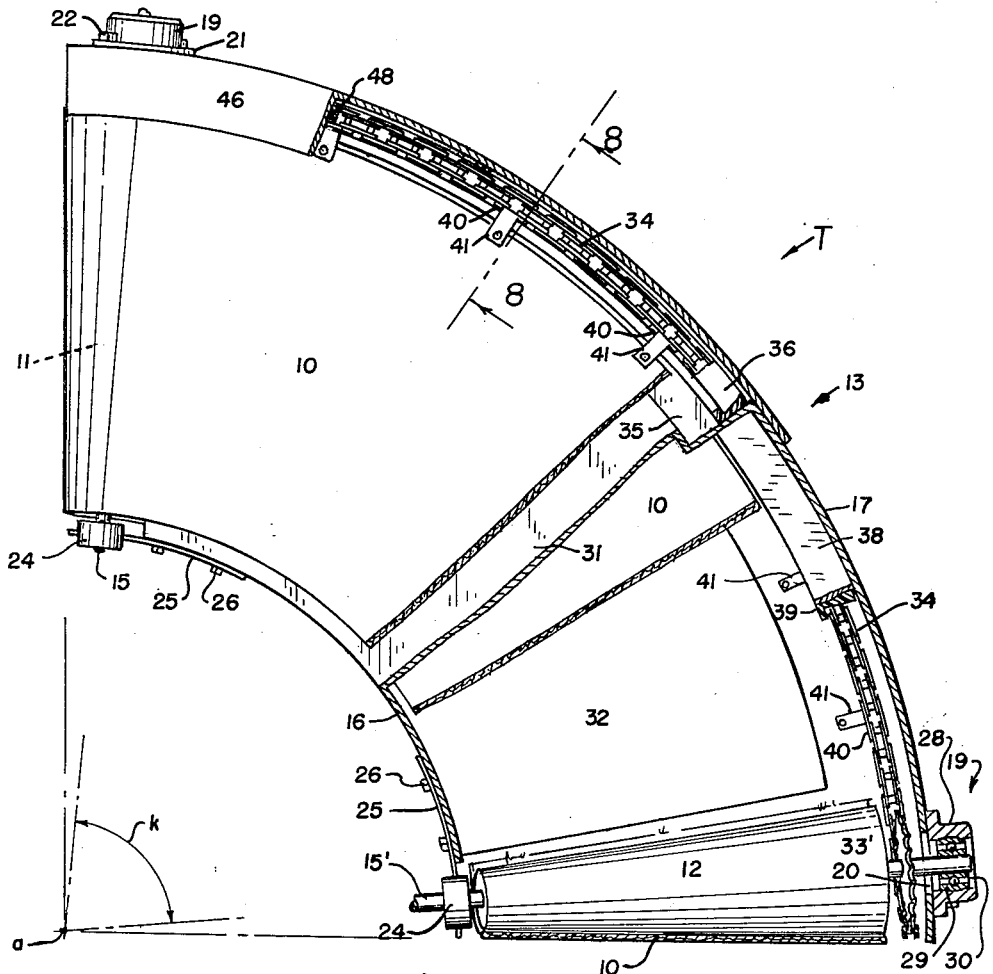

United States Patent Office 3,044,603
Patented July 17, 1962

3,044,603
CONVEYOR-BELT TURN
Charles L. Fry, Denver, Colo., assignor to Fry and Company, Inc., Canon City, Colo., a corporation of Colorado
Filed Aug. 25, 1958, Ser. No. 756,982
5 Claims. (Cl. 198—182)

This invention relates to endless belt conveyors and more particularly to an endless belt conveyor unit adapted to move along a curved path to thereby turn and change the direction of movement of items carried by the unit. The primary object of the invention is to provide a novel and improved endless belt conveyor adapted to so move along a curved path and the invention will be hereinafter referred to as a conveyor-belt turn or as a turn.

Another object of the invention is to provide a novel and improved conveyor-belt turn which is adapted to be incorporated into a conventional conveyor belt system in tandem with other belt units to provide for turning and changing of the direction of movement of items carried by the conveyor belt system or in some instances to offset the items from the conveyor belt system.

Another object of the invention is to provide a novel and improved conveyor-belt turn which presents a flat, horizontal carrying surface that is adapted to change direction as it moves along its course to thereby turn the direction of movement of items carried thereon.

Another object of the invention is to provide in a conveyor-belt turn a simplified and improved endless belt arranged to lie on a curved path which keeps its form throughout its endless movement about rollers.

Another object of the invention is to provide in a conveyor-belt turn improved means for suspending the conveyor belt to permit its movement along a curved path and about roller guides without any lateral shifting of the belt from its rollers or from its guides and without warping, buckling or creasing of the carrying surface of the belt.

Yet other objects of the invention are to provide a novel and improved conveyor-belt turn which is simple, neat appearing, and easily installed in different conveyor belt systems; which may be powered by conventional drive means, and which is a low-cost, rugged and durable unit.

With the foregoing and other objects in view, all of which more fully hereinafter appear, my invention comprises certain novel and improved constructions, combinations and arrangements of parts and elements as hereinafter described and as defined in the appended claims and illustrated in the accompanying drawings in which:

FIGURE 7 is a plan view of the turn per se, as illustrated at FIG. 1, but on a substantially enlarged scale and with portions of elements being progressively broken away to show parts otherwise hidden from view.

FIGURE 8 is a fragmentary sectional detail view as taken from the indicated line 8—8 at FIG. 7, but on an enlarged scale.

FIGURE 9 is a fragmentary sectional detail view as taken from the indicated line 9—9 at FIG. 8, but on a further enlarged scale.

Conveyor belt systems using flat endless belts find many uses in industry and especially in the field of transportation where packages, cases and the like must be moved from one location to another. Moreover, an endless belt system may be extended a considerable distance by a tandem arrangement of a number of belt units and the design of such a system will necessarily depend upon the arrangement of the building, factory or warehouse.

In many instances it is desirable, and even necessary to effect a change in the direction of movement of objects carried on an endless belt conveyor. In the past such turning and changing of direction of movement has been accomplished in various ways, as by rotating tables, drops, pusher belts and by endless belt turns. The most desirable type is the latter and several types of endless belt turns have been proposed in the past.

The fundamental principles of operation and construction of an endless belt turn are known. An endless belt of a type which may assume a suitable arcuate surface form is mounted between two rollers which are spread apart in a radial pattern to define the termini of the turn. Actually the geometry of a turn is comparatively simple for a belt may assume a general form of a conical frustum which flattens out to a curved arc and the rollers may be conical with all transverse radial elements and the axes of both terminal rollers extending to a common point of the intersection $a$.

However, in the past it has been impossible to practicably construct and use such a turn using standard conventional belting material. Such material is pliable, but substantially non-stretchable and when mounted between rollers, it will generally warp and buckle because there is a tendency for the belt to move toward the polar axis point of the rollers. Stretchable wire belts and restraining means carried on the belts have been proposed with only indifferent success and conveyor belt turns are not in general use.

With such in view, the present invention was conceived and developed and comprises, in essence, a conveyor belt turn of an exceedingly simple design using a conventional type but structurally improved belt. This belt is carried upon suitable conical rolls and all elements are carried in frame members which include improved retaining arrangements adapted to hold the belting in a flat, horizontal position and permit it to move without any tendency for it to creep toward the common polar axis point or the wrinkle or buckle as it moves about the rolls. The invention further includes improved antifriction restraints to assure perfect operation of the conveyor at all times.

Figure 1:
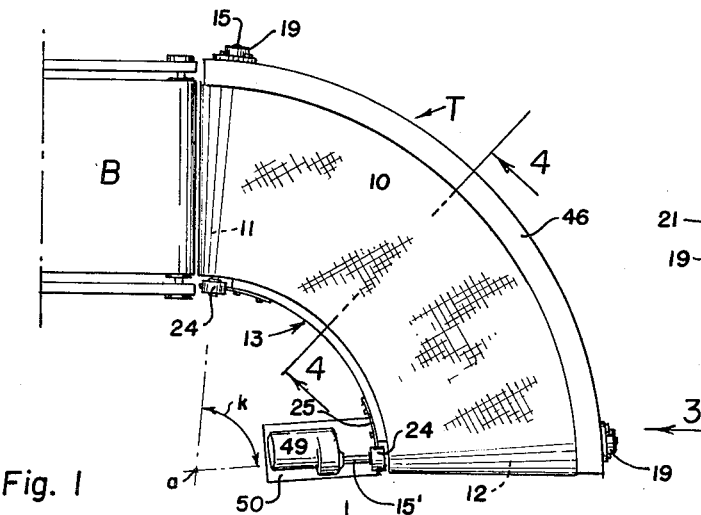
FIGURE 1 is a plan view of a turn constructed in accordance with the invention, and being shown as abutting the end of, and in tandem, with a conventional conveyor belt, illustrative of one mode of using the turn.
Figure 3:
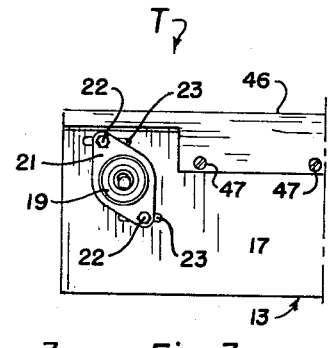
FIGURE 3 is a side elevational view of a fragmentary portion of the turn per se as from the indicated arrow 3 at FIG. 1, but on an enlarged scale.
Figure 2:
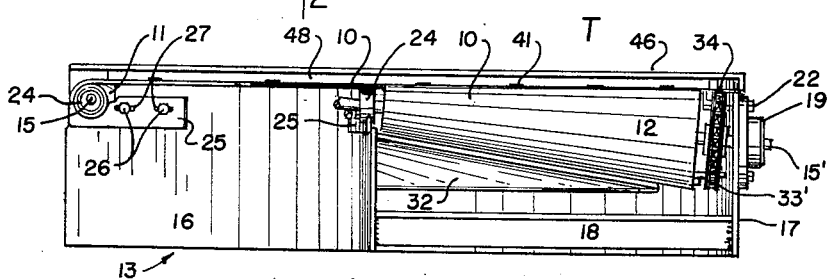
FIGURE 2 is a front elevational view of the turn per se, as from the indicated arrow 2 at FIG. 1, but on an enlarged scale.
Figure 4:
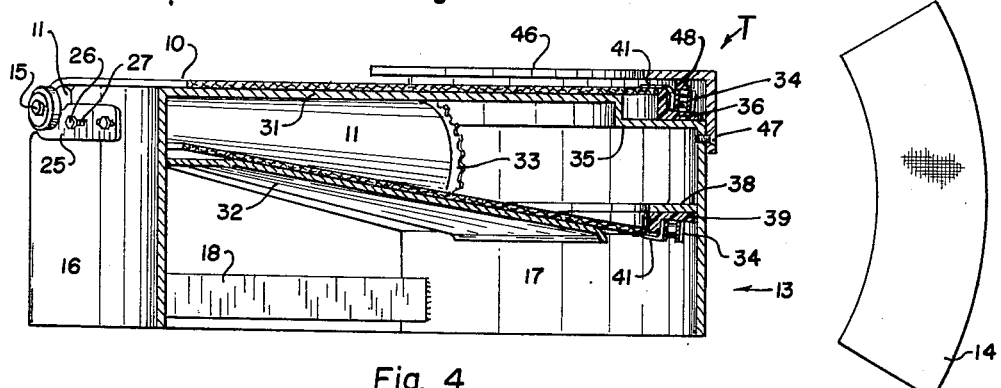
FIGURE 4 is a transverse sectional view of the turn per se as taken from the indicated line 4—4 at FIG. 1, but on a further enlarged scale.
Figure 6:
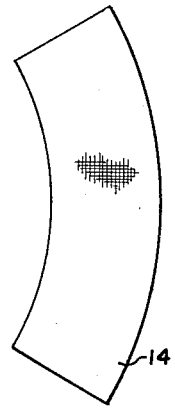
FIGURE 6 is a plan view of a single sector-shaped lamina of the belt.

Referring more particularly to the drawing, the improved conveyor belt turn T, hereinafter refererd to as a turn, is formed as an acuate endless belt 10 mounted upon and between a head roll 11 and discharge roll 12. These rolls are mounted in a radially spreading relation in a suitable arcuate frame 13. This turn T is adapted to be coordinated into a conventional conveyor belt system in a number of different ways as by aligning the turn T with a conventional straight conveyor belt B as at the end of the belt B as illustrated at FIG. 1. The other end of the turn may be aligned with another endless belt or with a discharge slide or the like to permit continued movement of material from the turn. The turn T may be used for still other purposes not suggested herein, either alone or in combination with other conveyor systems.

The turn T is illustrated as encompassing a 90 degree arc, but this arc may be varied from a few degrees to considerably more than 90 degrees, depending entirely upon the arc shift desired. The curved belt 10 is continuous with the edges being circular arcs when the belt is laid flatly with one portion lying upon the other. When the opposite sides of the belt are separated the geometrical form may be a substantially flat, circular washer for a 180-degree turn and it may assume the form of a frustum of a cone for a turn of an angle less than 180 degrees, as clearly illustrated at FIG. 5. These factors will be considered in designing a proper belt for a given turn. The proportions of the belt may be easily determined and the two spreading rollers 11 and 12 whereon the belt is mounted are frusto-conical in form, with their projected apices being at a common point of intersection $a$.

Figure 5:
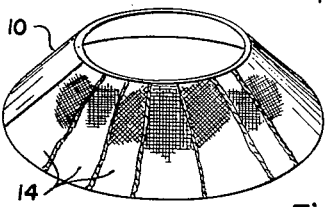
FIGURE 5 is a diagrammatic perspective view of a frusto-conical shaped belt of a type adapted for use in turn such as that at FIG. 1, but illustrated on a reduced scale and with portions and layers being broken away to indicate the nature of the belt construction.

The belt 10 is made of any pliable non-stretchable material such as ordinary belting which has several layers of webbing laminated together as with vulcanized rubber. To obtain the curved or frusto-conical form having the desired width, the webbing material is cut as a number of arcuate sectors 14 which are overlapped to form several layers and are joined together as by butting sectors of the same layer as illustrated at FIG. 5. The webbing 14 is set as layers of alternating weave in such a manner that one layer has its weave substantially at 45 degrees or on a bias to the adjoining layers as illustrated at FIG. 5.

The frusto-conical rollers 11 and 12 will, theoretically, hold the frusto-conical belt in proper position to provide for uniform movement of the various transverse segments of the belt as it rotates in a curved path of an arc. The upper edge or element of each frusto-conical roll is horizontal to hold the upper surface of the belt in a horizontal plane, and in order to provide for a 90 degree turn, or turn of any selected degree, the axis of each roll is set so that the outer edge or element is at a 90 degree arc with the outer edge or element of the other roll. It follows that the axle 15 of the head roll and the axle 15' of the discharge roll are respectively inclined from the horizontal and are spread apart at an angle less than 90 degrees, or any other selected turn degree as at the indicated angle K illustrated at FIG. 7.

In further detail, the framework 13 of the turn includes a vertical arcuate inner wall 16 and a similar vertical arcuate outer wall 17, and both of these walls extend through the 90 degree angle or other selected angle of the turn to lie at each side of the belt 10 itself. These wall sections 16 and 17 are interlocked in any suitable manner as by transverse base struts 18. Each roller, 11 and 12, is mounted upon its respective inclined shaft, 15 and 15', which extends beyond each end of the rollers and to and beyond the walls 16 and 17, to be carried in self-aligning bearings mounted on the walls.

The outer-wall self-aligning bearings 19 fit into suitable orifices 20 which are supported by flanged connections 21, having mounting bolts 22 which are slideable in horizontally mounting holes 23 in the wall 17. Each inner-wall self-aligning bearing 24 is mounted upon a horizontally shiftable plate 25 which is arcuately formed to lie against the surface of the inner wall and to be bolted thereon as by bolts 26 which extend through slotted orifices 27 in the plate 25 to effect the horizontal shiftable movement of the plate. These self-aligning bearings are of a conventional type, and, as illustrated in section at FIG. 7, each bearing includes an outer cylindrical shell 28, a spherical intermediate shell 29 and a bearing race 30 whereon an axle 15 is mounted.

The horizontally-disposed upper surface of the belt 10 rests upon an arcuate table 31 which extends from the inner wall 16 to the outer wall 17 around the unit from the inner edge of each roller as a smooth flat surface whereon the belt 10 may slide. This surface may be of polished metal or otherwise treated to have a low-friction characteristic and to prevent sticking of the belt thereon. The sloping lower surface of the belt is supported on a second table 32 beneath the lower surface of the belt. This table is shaped as a portion of a flat cone attached to the inner wall 16, and is also formed as a smooth, low-friction surface.

The shafts 15 and 15' include sprockets 33 and 33' at the outer side of the rollers adjacent to the outer wall 17 and the sprockets are interconnected by a chain 34 of a type which flexes laterally as well as about the axis of the sprocket so that the path of the chain may lie adjacent to the outer wall 17, as illustrated, and alongside the curved outer edge of the belt 10. To accommodate the chain, the upper table 31 is formed with a radially extended pocket 35 at the outer circumference of table 31 adjacent to the outer wall 17. An arcuate angle-shaped guide 36 is mounted in this pocket to support the chain 34 and to hold it in its selected path about the unit. This guide 36 is made of a low-friction material so that the chain may move with ease therein and molded or shaped nylon has been found to be ideal for this purpose. The guide 36 is set in position in the pocket 35 as by countersunk rivets 37 or in any other suitable manner.

An arcuate ledge 38 outstands from the inner surface of the outer wall 17 opposite the table 32 and an arcuate angle-shaped guide 39 of low-friction material extends about the undersurface of this ledge 38 complementary with the guide 36. The chain portion 34 at the lower end of the sprocket is directed about this guide 39 to complete a controlled course of the chain which moves in arcuate paths having a center at the polar axis point A.

In the past the critical problem involved in the design of a turn as set forth has been to hold a belt 10 in proper position along the course of the turn without the belt slipping toward the axis point or without the belt warping and buckling. To solve these problems, flexible belts have been suggested which are made of woven wire or the like. Also attempts have been made to hold the belt in a given path as by lugs upon the belt. Neither of such constructions is satisfactory because of buckling, wrinkling and the like. However, it was discovered that if the belt 10 were held in position on the conical rolls and about the curved path in a loose manner, with some yielding at the restraining points, the belt would move on the curved path without undesirable buckling and wrinkling.

Selected links 40 of the chain 34 are formed with outstanding tongues 41 which overlap the outer edge of the belt 10 and connect therewith. This connection of each tongue to the belt is made in a loose manner to provide for the necessary play discovered to be so essential for smooth operation of the unit. One form of this linkage connection is illustrated at FIGS. 8 and 9 where the tongue 41 includes a cylindrical stud 42 that extends through an orifice 43 in the belt 10. The orifice 43 is reinforced by a grommet 44 having an inside diameter which is substantially larger than the diameter of the stud 42. A washer 45 is affixed to each side of the stud 42 and the length of the stud is slightly greater than the width of the grommet 44. This permits substantially a three-dimensional play of the stud 42 within the grommet 44.

To meet the need for freedom of movement at the point of suspension of the belt end to the tongue 41 it would be possible to have other types of yieldable connections. For example, the stud 42 may be encased within a sponge rubber type washer to permit such yieldable connection.

To further restrict the movement of and to protect the chain mechanism, the outer circumferential wall 17 of the unit is overlaid by an angular shield 46 which bolts against the outside edge of the wall 17 as by bolts 47. A circumferential low-friction restraining guide 48 depends from the under surface of this shield 46 to lie against and to hold the chain 34 in position on the guide 36.

The turn may be operated by any suitable power means and it is preferable to use the discharge roll 12 as the drive in order to keep tension upon the upper surface of the belt 10 as the unit is being operated. This drive means may be any conventional motor unit 49 suitably mounted upon a plate 50 and connected to an extension of the shaft 15′ as in the manner clearly illustrated at FIG. 1.

It is obvious that others skilled in the art can devise and build alternate and equivalent constructions which are within the spirit and scope of the present invention and hence I desire that my protection be limited, not by the constructions illustrated and described, but only by the proper scope of the appended claims.

I claim:

1. The combination with a conveyor-belt turn having a curved, endless belt adapted to form an arcuate sector when lying flatly, a pair of frustro-conical rolls adapted to be mounted within the belt at spaced angular end positions to stretch the belt about an arcuate sector with the top surface of the belt forming a curved conveyor path, and support means between the rolls adapted to support the surfaces of the belt, of a guide means disposed alongside and outwardly of the outer peripheral edge of the belt to define a fixed path paralleling the edge of the belt, a continuous drive means carried on the guide means and being adapted to move in unison with the belt movement along said fixed path, said guide means having a guide wall disposed intermediate said belt and said continuous drive means, and a plurality of regularly spaced, connectors affixed to the continuous drive means and extending over said wall inwardly to and being connected with the belt at corresponding regularly spaced points adjacent to the outer edge thereof, whereby said connectors resist lateral shifting movements of the belt towards the axis point of the turn as the belt moves about its sector shaped path, and pulls the continuous drive means against the side wall of the guide means.

2. In the combination defined in claim 1, said connectors being tongue-like members outstanding laterally of the continuous drive means and with the connections of the tongues to the edge of the belt being loose to allow for play of the belt between adjacent connections and with respect to the continuous drive means to prevent wrinkling of the belt as it passes over the table means.

3. In the combination defined in claim 1 wherein said guide means includes a sprocket at the outer end of each roll and a fixed arcuate strip between the rolls outwardly of the outer edge of the belt, said continuous drive means includes a double-flexible chain interconnecting the sprockets and said wall is formed as a ledge portion upstanding from the strip and having an outward anti-friction surface against which the chain bears and said connectors being tongue-like members on the chain links which overhang the ledge portion and extend to the belt.

4. In the combination defined in claim 3 wherein the connection of the tongue-like members to the belt is effected by pins on one member extending through orifices in the other member, with a loose fit of the pins in the orifices, whereby to allow for play of the belt between adjacent connectors with respect to the continuous drive means to prevent wrinkling of the belt as it passes over the support means.

5. In the combination defined in claim 1, an arcuate shield overlying the continuous drive means at the outer peripheral edge of the belt, and an anti-friction guide depending from the shield adapted to contact the upper surface of the continuous drive means.

References Cited in the file of this patent

UNITED STATES PATENTS

| | | |
|---|---|---|
| 1,254,941 | Snow | Jan. 29, 1918 |
| 1,948,332 | Carter | Feb. 20, 1934 |
| 2,234,537 | Blackburn | Mar. 11, 1941 |
| 2,446,890 | Stadelman | Aug. 10, 1948 |
| 2,633,975 | Koerber | Apr. 7, 1953 |
| 2,694,583 | Zitza et al. | Nov. 16, 1954 |
| 2,841,515 | Runton | July 1, 1958 |
| 2,866,538 | Goldberg | Dec. 30, 1958 |